Oct. 9, 1934.    L. R. PRITCHETT    1,976,371
ELECTRIC WIRE FASTENING DEVICE
Filed Jan. 27, 1934    2 Sheets-Sheet 1
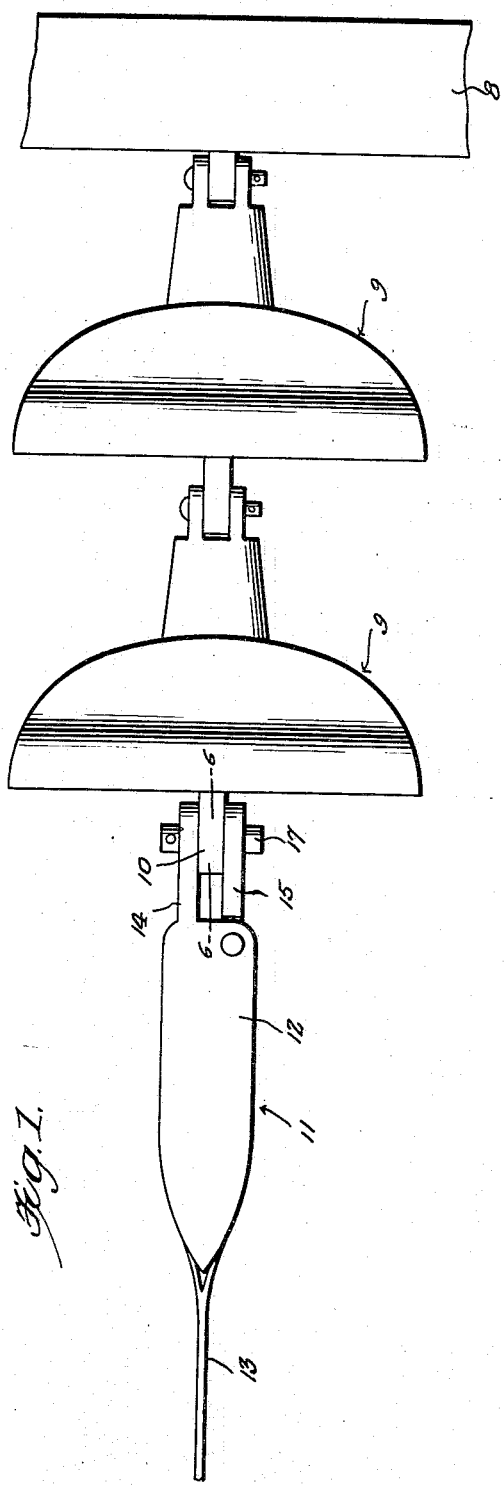
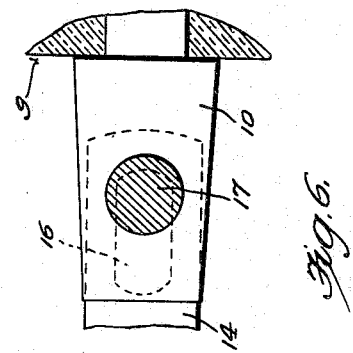
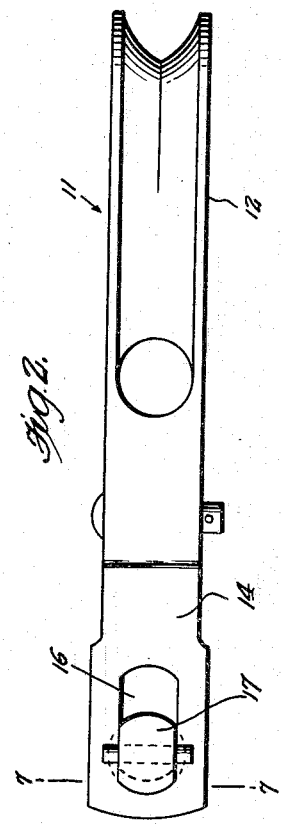
Inventor
*Leo R. Pritchett,*
By *Clarence A. O'Brien*
Attorney Oct. 9, 1934. L. R. PRITCHETT 1,976,371
ELECTRIC WIRE FASTENING DEVICE
Filed Jan. 27, 1934 2 Sheets-Sheet 2
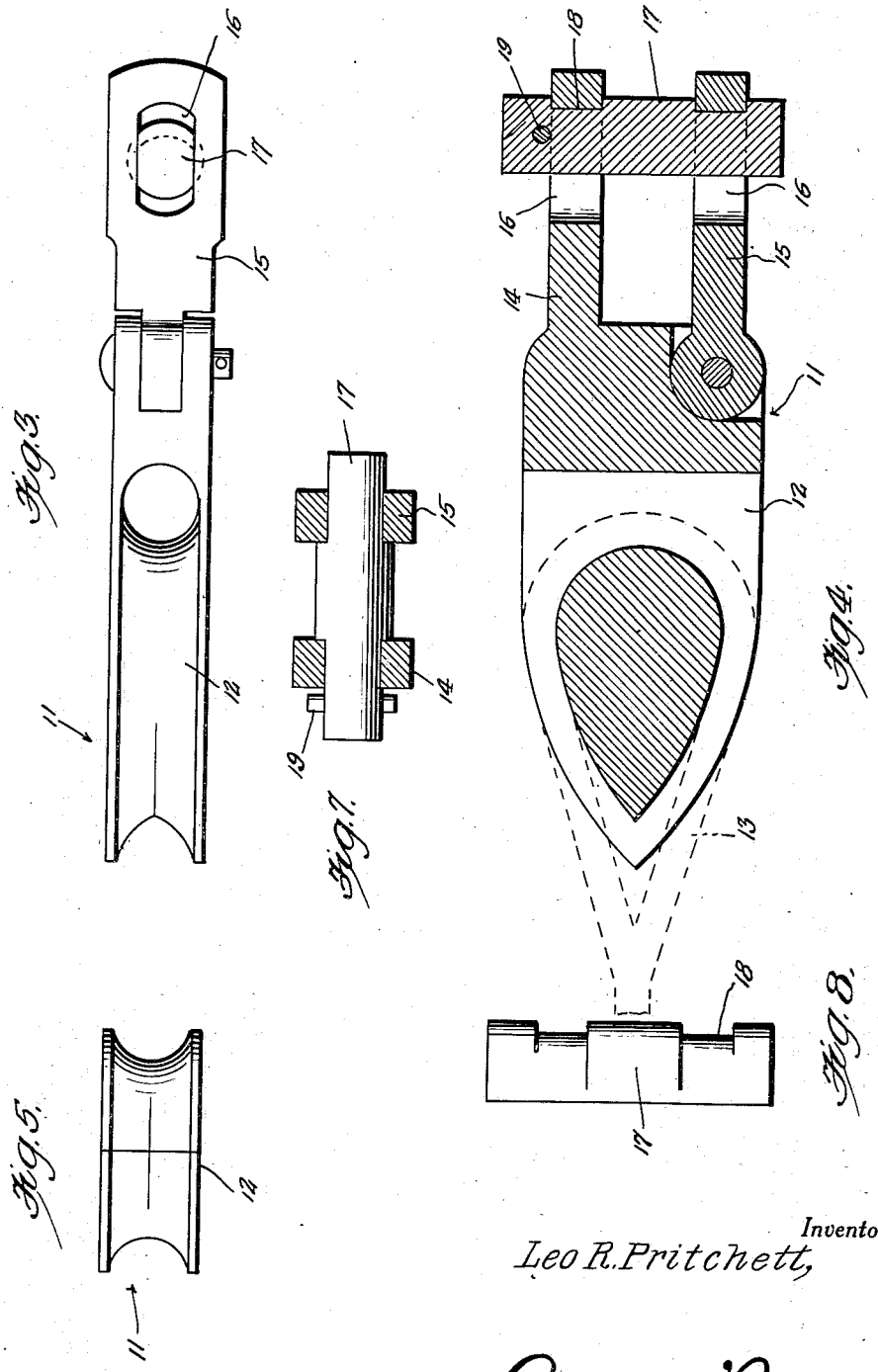
Inventor
Leo R. Pritchett,
By Clarence A. O'Brien
Attorney Patented Oct. 9, 1934

1,976,371

UNITED STATES PATENT OFFICE 1,976,371

ELECTRIC WIRE FASTENING DEVICE

Leo Robert Pritchett, New Orleans, La., assignor of one-half to Ignatius Edward Uzzo, New Orleans, La.

Application January 27, 1934, Serial No. 708,704

1 Claim. (Cl. 24—115)

This invention relates to an improved fastening device for use in association with power lines and over-head electricity conducting wires, and it has more particular reference to the type of fastening device employed at the end of the line for fastening the line to a cross-head or bar on the telegraph pole or other similar support, and for use at other places in the line.

More specifically stated, the invention has reference to a novel wire fastener to take the place of the type of fastener which includes a thimble and a complemental attaching shackle, which types of devices are used for connection to one or more porcelain insulators which are in turn connected with a pole. At the present time, so far as I am aware, the combination thimble and shackle now employed comprises a substantially heart-shaped thimble with which the wire is connected, and a relatively movable U-shaped shackle. The arms of the shackle are formed with eyes and a coupling pin is passed through these eyes and held in place by a removable cotter key. The cotter key is passed through an aperture in a projecting lug on the insulator. Fastening devices of this class although satisfactory after installation are unsafe and difficult to install. This will be clear when it is remembered that devices of this kind must be placed in position at points where an indefinite number or gang of wires are present. Naturally, the presence of these wires, charged with deadly current, makes it necessary to employ unhandy makeshift sticks or reach rods about six feet long. It is unsafe for a workman to get much closer to the wires than about six feet and it is therefore easy to realize how difficult and unhandy it is to use sticks in attempting to make the connection of the wire fastener with the insulator, to place the cotter key in place and to bend or spread the ends of the prongs of said key in order that it will stay put.

The purpose of this invention is to provide a simplified, dependable and efficient fastening means which avoids these difficulties, and which is superior in that it is a safety appliance, and susceptible of being placed in position with little or no trouble and in a minimum amount of time.

Broadly stated, the improved fastener comprises a single body which includes the features of the thimble as well as the shackle. The shackle is permanently attached to the thimble and the shackle is made with a relatively rigid arm and a complemental swingable arm, and these arms are associated with a coupling pin which is connected to the apertured lug of the complemental insulator.

The advantage of this arrangement will become more readily apparent from the following description and drawings.

In the drawings:

Figure 1 is a top plan view of a structure showing a cross head such as is used on a pole, a pair of insulators, and the improved wire fastening or anchoring device connected with one of the insulators.

Figure 2 is an edge elevation of the improved wire fastening device itself.

Figure 3 is a similar view observing the structure from an opposite side.

Figure 4 is a central horizontal sectional view through the same.

Figure 5 is an end view of either Figures 2 or 3.

Figure 6 is an enlarged cross sectional view taken approximately upon the plane of the line 6—6 of Figure 1.

Figure 7 is a similar sectional view taken approximately upon the plane of the line 7—7 of Figure 2.

Figure 8 is a detail view in side elevation showing the coupling pin.

Referring now to the drawings in detail, it will be seen that the reference character 8 designates a cross-piece or cross-head such as is used on a telegraph pole or the like. Attached to this cross-head as shown in Figure 1, are insulators 9 fastened together. One of the insulators is provided with a projecting apertured lug 10 and it is this lug to which the improved fastening device, designated by the reference character 11, is connected. The device 11 comprises a body 12 of the configuration clearly shown in Figure 4, this being provided with a suitably shaped opening with which the end of the wire 13 is connected as shown in dotted lines in Figure 4. The shackle, which forms a part of the body comprises a pair of complemental arms, that is, a rigid arm designated by the numeral 14 and a companion pivotally mounted arm 15. These arms are formed with elongated oppositely arranged openings 16 through which the coupling pin 17 passes. This coupling pin has spaced notches 18 providing keeper seats which occupy the position seen in Figure 4 when the wire is stretched. The reference character 19 designates a retaining pin for the main coupling pin 17. The coupling pin 17 is of course passed through the lug 10.

When the device is in use it occupies the position shown in Figure 1. With this arrangement it is obvious that the device may be more easily connected with the lug 10 by first swinging the shackle arm 15 out, whereby to permit coupling pin 17 to be passed through the aperture in the lug 10. Then the arm 15 is swung back and engaged over the coupling pin and when the wire is released, an endwise pull is exerted whereupon the arms 14 and 15 become firmly seated in the keeper seats 18 of the coupling pin. Thus the device stays firmly in place.

It is believed that by carefully considering the description in conjunction with the drawings a clear understanding of the refinements and improvements in this device will be quite clear to persons skilled in the art to which the invention relates. Therefore, a more lengthy description is regarded unnecessary.

Minor changes in size, shape and rearrangement of details coming within the field of invention claimed may be resorted to in actual practice if desired.

Having thus described the invention, what I claim as new and desire to secure by Letters Patent is:—

An electric wire fastening device of the character described comprising a body portion having an opening therethrough for the passage of the wire, an integral arm projecting from one end of the body portion, an arm hingedly mounted on the body portion for swinging movement to a position in spaced parallelism to the integral arm, each of said arms being provided with a longitudinally extending slot, and a coupling pin removably mounted in the slots and having spaced recesses in one side thereof for the reception of the outer end walls of the slots.

LEO ROBERT PRITCHETT.